US007383127B2

(12) United States Patent
Matsuo et al.

(10) Patent No.: US 7,383,127 B2
(45) Date of Patent: Jun. 3, 2008

(54) NAVIGATION APPARATUS FOR RECEIVING DELIVERED INFORMATION

(75) Inventors: Shigeru Matsuo, Hitachinaka (JP); Kimiyoshi Machii, Hitachi (JP); Katsuaki Tanaka, Hitachi (JP); Kozo Nakamura, Hitachiota (JP); Yoshinori Endo, Mito (JP); Michio Morioka, Hitachi (JP); Yoshitaka Sumitomo, Hitachinaka (JP)

(73) Assignees: Hitachi, Ltd., Tokyo (JP); Xanavi Informatics Corporation, Kanagawa (JP)

( * ) Notice: Subject to any disclaimer, the term of this patent is extended or adjusted under 35 U.S.C. 154(b) by 50 days.

(21) Appl. No.: 11/238,979

(22) Filed: Sep. 30, 2005

(65) Prior Publication Data
US 2006/0036364 A1 Feb. 16, 2006

Related U.S. Application Data

(63) Continuation of application No. 10/175,318, filed on Jun. 20, 2002, now abandoned.

(30) Foreign Application Priority Data

Jan. 14, 2000 (JP) ............................. 2000-005376

(51) Int. Cl.
*G01C 21/32* (2006.01)
(52) U.S. Cl. ..................... 701/211; 701/208; 340/995.2
(58) Field of Classification Search ................ 701/200, 701/210, 211, 208; 340/995.18, 995, 990, 340/995.2; 705/5; *G01C 21/34*
See application file for complete search history.

(56) References Cited

U.S. PATENT DOCUMENTS

| 4,891,760 | A | * | 1/1990 | Kashiwazaki et al. ...... 701/200 |
|---|---|---|---|---|
| 4,984,168 | A | * | 1/1991 | Neukrichner et al. ....... 701/210 |
| 4,992,947 | A | * | 2/1991 | Nimura et al. .............. 701/210 |
| 5,159,556 | A | * | 10/1992 | Schorter ..................... 701/210 |
| 5,161,886 | A | * | 11/1992 | De Jong et al. ............ 701/209 |
| 5,184,303 | A | * | 2/1993 | Link .......................... 701/210 |
| 5,285,391 | A | * | 2/1994 | Smith et al. ................ 701/200 |
| 5,369,588 | A |   | 11/1994 | Hayami et al. ........ 340/999.19 |
| 5,928,305 | A |   | 7/1999 | Nomura ...................... 701/207 |
| 6,058,350 | A |   | 5/2000 | Ihara .......................... 701/208 |
| 2002/0032521 | A1 |   | 3/2002 | Machii et al. .............. 701/208 |
| 2002/0194037 | A1 |   | 12/2002 | Creed et al. ................... 705/5 |

(Continued)

FOREIGN PATENT DOCUMENTS

EP 0782080 7/1997

(Continued)

*Primary Examiner*—Cuong Nguyen
(74) *Attorney, Agent, or Firm*—Mattingly, Stanger, Malur & Brundidge, P.C.

(57) ABSTRACT

In a communication-type navigation system for downloading map data according to the present invention, a reduction in the amount of map information to be transferred, correction of a position measured by a GPS, and delivery of advertisements are effected. In this system, a terminal 5 stores rough map data in advance. Then, when detailed map data is required, it is downloaded from a map data delivery center to the terminal 5. Further, together with the map data, GPS correction information is delivered to the terminal 5 from the map data delivery center 80. Still further, coupon information associated with an advertisement is displayed and an electronic mail on the coupon information is issued, by the map data delivery center.

2 Claims, 12 Drawing Sheets

U.S. PATENT DOCUMENTS

| | | | |
|---|---|---|---|
| 2003/0156049 A1 | 8/2003 | Behr et al. | 340/995.2 |
| 2006/0036364 A1* | 2/2006 | Matsuo et al. | 701/211 |

FOREIGN PATENT DOCUMENTS

| | | |
|---|---|---|
| JP | 9325040 | 12/1997 |
| JP | 10246641 | 9/1998 |
| JP | 11248484 | 9/1999 |
| JP | 11296540 | 10/1999 |
| WO | 9812650 | 3/1998 |

* cited by examiner

NAVIGATION APPARATUS FOR RECEIVING DELIVERED INFORMATION

The present application is a continuation of application Ser. No. 10/175,318, filed Jun. 20, 2002 now abandoned, the contents of which are incorporated herein by reference.

BACKGROUND OF THE INVENTION

The present invention relates to a navigation apparatus for giving route guidance using map data delivered through communication or broadcasting. The invention also relates to an information delivery apparatus for delivering map data using communication and broadcasting.

DESCRIPTION OF THE RELATED ART

Recently, there are proposed various navigation apparatuses for giving a vehicle guidance on a route to a destination.

In JP-A-9-325040 and JP-A-10-246641, for example, there are disclosed navigation apparatuses for downloading map data from a data center. Since the navigation apparatuses of this type eliminates the need for installing therein a storage device such as a CD-ROM unit, miniaturization of the apparatuses can be effected. In addition, the most up-to-date map data and real-time information can be obtained from the apparatuses.

In JP-A-9-325040, there is disclosed a navigation system in which a route search is not performed by a navigation apparatus, but is performed by a server. The server is provided so that it can be communicated with the navigation apparatus.

It is well known that position measurement using a GPS (Global Positioning System) produces an error of approximately 100 m. In order to reduce the error, conventional navigation apparatuses employ a D-GPS. In this system, GPS error information broadcasted by an FM-multiplexed data broadcast is used to correct the position measurement error caused by the GPS. There is also provided a navigation apparatus equipped with a gyro sensor, for using an output from the gyro sensor to correct the position measurement error caused by the GPS.

In JP-A-11-296540, there is disclosed a technique for delivering advertisement information associated with a map by using an Internet. Further, in JP-A-11-248484, there is disclosed a technique for providing advertisements for a vehicle-mounted terminal.

The conventional techniques described above have the following disadvantages:

(1) Disadvantage of the Techniques Described in JP-A-9-325040 and JP-A-10-246641

In the navigation apparatuses described in these literatures, map data is downloaded from the data center. Thus, if a distance from the current position of a vehicle to a destination is increased, it becomes necessary to download from the data center all the map data representing maps associated with a recommended route. For this reason, the amount of communication data increases, so that it sometimes happens that display of maps for route guidance is retarded, depending on communication conditions.

(2) Disadvantage of the Technique Described in JP-A-9-325040

In the navigation system described in this literature, the navigation apparatus does not perform a route search. The server provided so as to allow communication with the navigation apparatus performs the route search.

This system, however, does not takes into account action which should be taken in a situation where the position of a vehicle being under route guidance has been deviated from a route obtained by the route search.

(3) Disadvantage of Correction of an Error Produced in Position

Measurement Using the D-GPS and the Gyro Sensor
Since these techniques require special hardware such as an FM receiver and the gyro sensor, the cost of the navigation apparatus rises.

(4) Disadvantage of the Techniques Described in JP-A-11-296540 and JP-A-11-248484

Recently, there is proposed service in which discounts on merchandise advertised through the Internet are given. In this service, advertisement information on a piece of the merchandise, laid open to the public through the Internet, is displayed by using a personal computer. In order to get a discount on this merchandise, the advertisement information should be printed onto paper by a printer, and presented to an advertiser as a coupon. If this type of service is applied to the techniques described in the above-mentioned literatures, the printer becomes essential. For this reason, this service is not suited to be in use for a vehicle-mounted navigation apparatus and a navigation apparatus of a hand-held terminal type, because in the cases of these navigation apparatuses, an installing space for the printer is limited.

SUMMARY OF THE INVENTION

The present invention has been made in view of the problems described above. It is therefore an object of the invention to solve various kinds of the problems with these conventional navigation apparatuses and to thereby improve the operability of a navigation system of a type which downloads map data delivered through communication and broadcasting to give route guidance.

More specifically, it is a first object of the present invention to ensure quick display of a map for route guidance even when map data delivered from a data center to a navigation apparatus is decreased so as to effect a reduction in the amount of communication data.

Further, when the position of a vehicle being under route guidance has been deviated from a route obtained by a route search, it is a second object of the present invention to notify deviation of the position of the vehicle that a user can take appropriate action.

Still further, it is a third object of the present invention to improve accuracy with which position measurement of a vehicle is performed, while effecting a reduction in the cost of a navigation apparatus.

Yet, it is a fourth object of the present invention to provide an environment where an advertisement coupon is available even if a printer cannot be installed.

In order to achieve the first object, a navigation apparatus according to a first aspect of the present invention obtains map data delivered through communication or broadcasting, and then stores the map data in a first storage area. The navigation apparatus also stores map data in a second storage area in advance. It is preferable that a map represented by the map data stored in the second storage area is rougher and more extensive than a map represented by the map data stored in the first storage area, which was delivered through communication and broadcasting. According to the first aspect of the present invention, if the map data delivered through communication and broadcasting does not contain all of map data on a route from the current position of a vehicle to a destination, it becomes possible to read out map data on the route from the second storage area and then to give route guidance using a map represented by the map data. Accordingly, even if the amount of the map data delivered through communication and broadcasting is decreased to effect a reduction in the amount of communication data, quick display of maps for route guidance can be performed.

Further, in order to achieve the second object, a navigation apparatus according to a second aspect of the present invention asks a user to check whether, if the current position of a vehicle being under route guidance has been deviated from a recommended route to a destination, a new route to the destination should be searched again. If an approval from the user can be obtained, the new recommended route to the destination is obtained from an information delivery device.

According to the second aspect of the present invention, if the position of the vehicle being under route guidance has been deviated from the recommended route, the user is asked to check whether the new route to the destination should be searched again. Accordingly, it becomes possible for the user to take appropriate action, according to whether the position of the vehicle has been deviated from the recommended route intentionally or unintentionally.

Still further, in order to achieve the third object, a navigation apparatus according to a third aspect of the present invention obtains GSP correction data from an information delivery device for delivering map data to correct a position measurement error caused by GPS position measurement means, when a vehicle being under guidance on a route to a destination has come close to a route change point such as an intersection on the route where the course of the vehicle should be changed.

According to the third aspect of the present invention, the GPS correction data is obtained from the information delivery device for delivering the map data. Thus, it can be so arranged that a receiver for receiving the map data also serves as a receiver for obtaining the GPS correction data. With this arrangement, special hardware such as an FM receiver or a gyro sensor is not required for obtaining the correction data. Thus, it becomes possible to improve measuring accuracy while achieving a reduction in the cost of the navigation apparatus.

Still further, in order to achieve the fourth object, an information delivery device according to a fourth aspect of the present invention delivers advertisement data. Then, in response to an instruction from a terminal that has received the advertisement data, the information delivery device notifies both the terminal that has received the advertisement data and the terminal of an advertiser of coupon information on an advertisement represented by the advertisement data.

According to the fourth aspect of the present invention, in response to the instruction from the terminal that has received the advertisement data, the coupon information is notified to the terminal that has received the advertisement data. The coupon information is also notified to the terminal of the advertiser. Accordingly, the advertiser can be informed that the coupon information has been notified to the terminal that has received the advertisement data. Thus, if the user of the terminal notifies the advertiser of the coupon information, the present invention according to the fourth aspect can provide an environment where an advertisement coupon can be utilized, even if a printer cannot be installed.

Other objects, features and advantages of the invention will become apparent from the following description of the embodiments of the invention taken in conjunction with the accompanying drawings.

DETAILED DESCRIPTION OF THE EMBODIMENTS

Now, embodiments of the present invention will be described.

First, a first embodiment of the present invention will be described.

Figure 1:
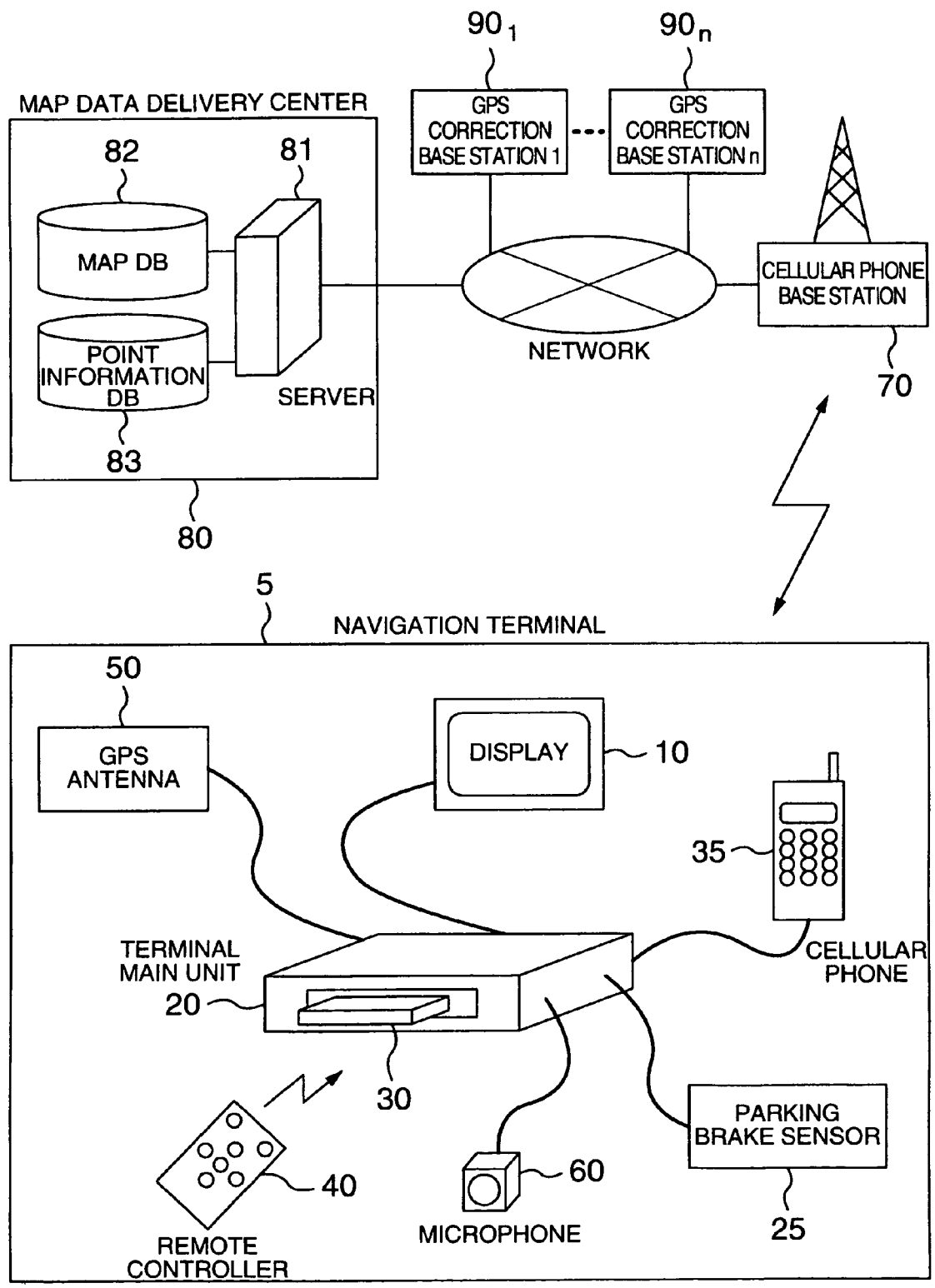
FIG. 1 is an illustrative diagram schematically illustrating a navigation system according to a first embodiment of the present invention.

FIG. 1 is an illustrative diagram schematically showing a configuration of a navigation system according to the first embodiment of the present invention.

In FIG. 1, reference numeral 5 denotes a communication-type navigation terminal for being mounted on a vehicle, reference numeral 70 denotes a cellular phone base station for performing radio communication with a cellular phone, reference numeral 80 denotes a map data delivery center for delivering map data, and reference numerals $90_1$ to $90_n$ denote GPS correction base stations for calculating GPS correction data.

First, the navigation terminal 5 will be described.

The navigation terminal 5 obtains map data delivered from the map data delivery center 80 and then gives guidance of a route to a destination, using the map data obtained. Further, the navigation terminal 5 stores rough map data covering large geographic areas in advance. The rough map data is the map data indicating only main map elements such as natural terrains of Japan, expressways, and national roads, for example. If map data to be displayed is not included in the map data obtained from the map data delivery center 80, the navigation terminal 5 uses the rough map data covering large geographic areas to give guidance of the route to the destination. With this arrangement, even in an area where communication with the map data delivery center 80 cannot be performed, it becomes possible to use the navigation terminal 5. Further, if a distance from a departure point to a destination is long, detailed map data covering only areas around the departure point and the destination can be obtained from the map data delivery center 80, and map data on areas located enroute to the destination can be obtained from the extensive, rough map data stored in advance, for example. With this arrangement, it becomes unnecessary to obtain all the map data representing the areas from the departure point to the destination, from the map data delivery center 80. Thus, even when the amount of data to be obtained from the map data delivery center 80 is reduced, quick display of maps for route guidance becomes possible. However, upon reception of a request from a user, all the map data on the route may also be obtained from the map data delivery center 80.

As illustrated in FIG. 1, the navigation terminal 5 comprises a terminal main unit 20, a display 10, a memory card 30, a remote controller 40, a GPS antenna 50, a cellular phone 35 equipped with an electronic mail receiving function, a microphone 60, and a parking brake sensor 25.

The memory card 30 is structured to be insertable into the terminal main unit 20, and stores information such as map data the terminal main unit 20 has obtained from the map data delivery center 80. The display 10 displays a map image outputted from the terminal main unit 20. The display 10 contains a loudspeaker, which supplies an audio output from the terminal main unit 20. The remote controller 40 receives an instruction from an operator and sends the instruction to the terminal main unit 20. The cellular phone 35 receives information such as map data from the map data delivery center 80, for supply to the terminal main unit 20. The GPS antenna 50 receives GPS data for supply to the terminal main unit 20. The microphone 60 delivers an audio output received to the terminal main unit 20. The parking brake sensor 25 senses a parking brake, and then supplies a sensing signal to the terminal main unit 20.

Figure 2:
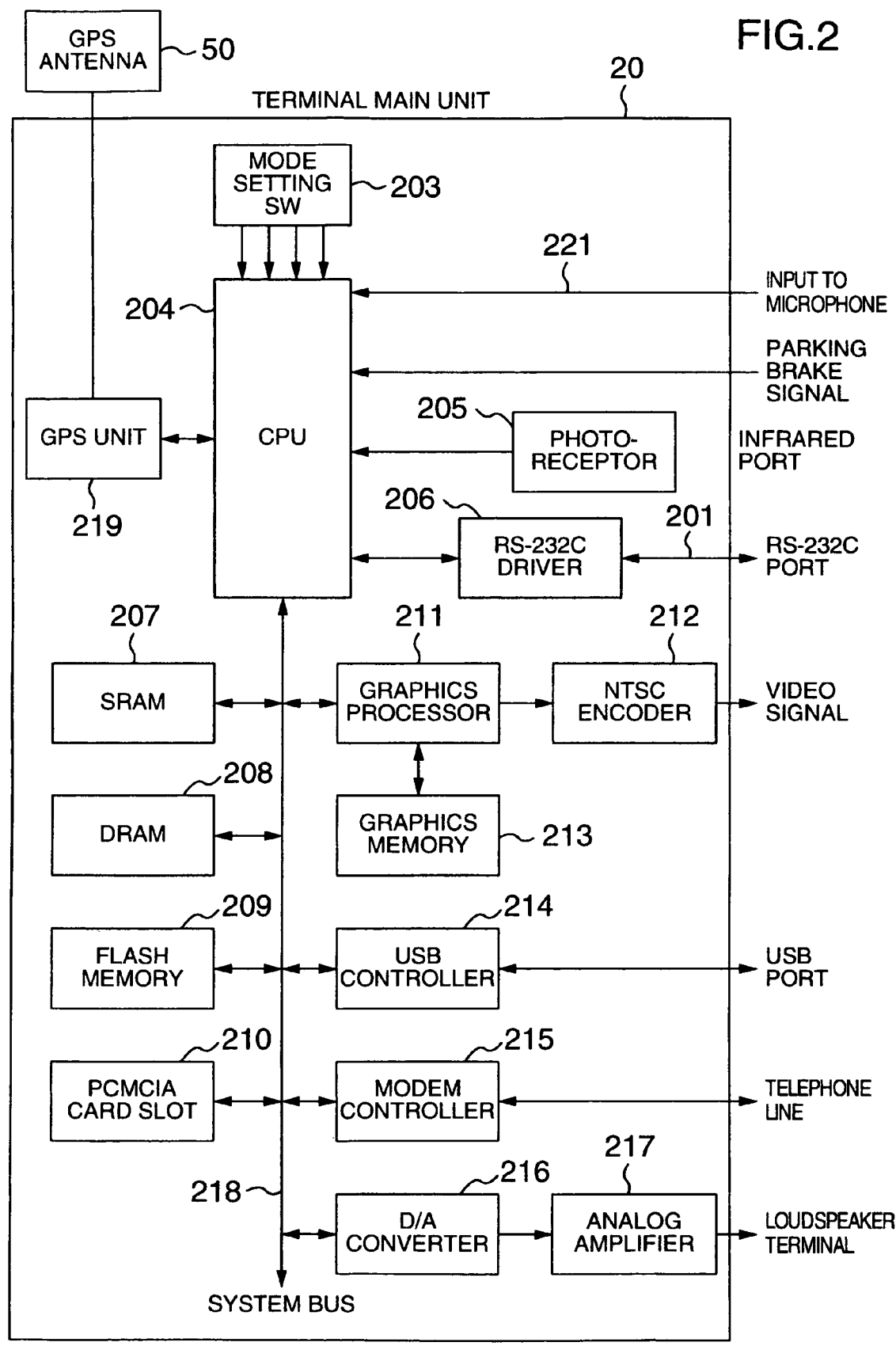
FIG. 2 is a block diagram showing a hardware configuration of a terminal main unit 5 of a navigation terminal 5 illustrated in FIG. 1.

FIG. 2 shows a hardware configuration of the terminal main unit 20.

In FIG. 2, a CPU 204 is a processor for performing supervision and control over the components of the terminal main unit 20. As illustrated, the CPU 204 is connected to the respective components through a system bus 218. The CPU herein assumes what is called a single-chip microcomputer in is which a communication function and a control function over peripheral devices such as an A/D converter and a D/A converter, and parallel I/Os are integrated into a single chip with a 32-bit RISC processor as a core. As the microcomputer suitable for this purpose, there is provided a Hitachi HD6417707, for example. Details of the Hitachi HD6417707 are described in a Hitachi's "SH7707 Hardware Manual".

The CPU 204 contains a plurality of communication ports, one of which is connected to a photoreceptor 205. The CPU 204 receives an instruction from the user input to the remote controller 40 via the photoreceptor 205. Other one of the communication ports is connected to an RS-232C driver 206. Since the RS-232C driver is a standard interface that has been traditionally employed, connection to various devices becomes possible. Other one of the communication ports is connected to the parking braking sensor 25. In response to a signal from the parking brake sensor 25, the CPU 204 senses a stop of a vehicle on which the navigation terminal 5 is mounted, and operates for giving route guidance responsive to the stop of the vehicle. Still further, other one of the communication ports is connected to the microphone 60. The CPU 204 recognizes the voice of the user input into the microphone 60 to analyze an instruction from the user.

An SRAM 207 and a DRAM 208 are employed as main memories for the CPU 204. A flash memory 209 is a nonvolatile memory that is rewritable. Programs, data that should not be erased when the navigation terminal is turned off, and extensive, rough map data are stored in the flash memory 209 in advance.

A graphics processor 211 is a processor for displaying a picture on a display 10. The graphics processor 211 has a function of writing a picture in a graphics memory 213 according to an instruction from the CPU 204 and a function of reading out the picture written periodically to display the picture on the display 10.

An NTSC encoder 212 converts RGB picture data outputted by the display function of the graphics processor 211 into an NTSC signal. The NTSC signal is supplied to the display 10, for display as a picture.

A USB (Universal Serial Bus) controller is provided to connect the terminal main unit 20 to a device having an USB interface. The USB interface is the one mainly employed for personal computers. For this reason, connection of peripheral devices for personal computers, such as a mouse and a CCD camera to the terminal main unit 20 becomes possible.

A modem controller 215 connects the terminal main unit 20 to a telephone line. The cellular phone 35 is connected to the modem controller 215 through the telephone line.

A D/A converter 216 converts digital audio data supplied from the CPU 204 to analog audio data. An analog amplifier 217 amplifies the analog audio data supplied from the D/A converter 216. The amplified analog audio data is outputted from the loudspeaker contained in the display 10 as an audio output.

A mode setting SW 203 specifies an operation mode for the terminal main unit 20. The mode setting SW 203 performs switching between a normal operation mode for the navigation apparatus and a program version-up mode. In the program version-up mode, collective erasing of data in the flash memory 209 is performed. Then, a new program is downloaded from the memory card 30, for writing in the flash memory 209. With this arrangement, program updating for the terminal main unit 20 can be readily performed.

A PCMCIA card slot 210 is an interface for the memory card 30. The CPU 204 makes access to the memory card 30 through the PCMCIA card slot 210, reads out data from the memory card 30, or writes data on the memory card 30.

A GPS unit 219 receives a GPS signal from a GPS satellite via the GPS antenna 50, and then uses the GPS signal to measure the position of a vehicle.

Figure 3:
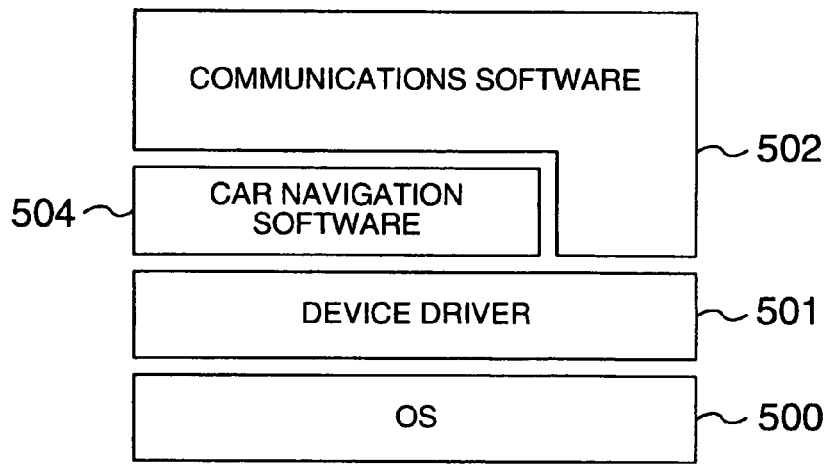
FIG. 3 is an illustrative diagram showing a configuration of software implemented on the terminal main unit 20 illustrated in FIG. 2.

Next, a configuration of software implemented on the terminal main unit 20 is shown in FIG. 3.

Incidentally, the respective software shown in FIG. 3 is stored in the flash memory 209 in advance, and then loaded into the SRAM 207 and the DRAM 208 by the CPU 204, for implementation.

In FIG. 3, an OS 500 is provided to control the overall operations of the terminal main unit 20 and performs task management. A device driver 501 contains driver software by which the CPU 204 performs data communications with the cellular phone 30 via the modem controller 215, driver software by which the CPU 204 receives an instruction from the remote controller via the photoreceptor 205, and driver software by which the CPU 204, in cooperation with the graphics processor 211, exercises control over the screen of the display 10. Communications software 502 is provided so that the navigation terminal 5 performs communication with the map data delivery center 80 over a network such as the Internet. The communications software contains WWW browser software and electronic mail software. Car navigation software 504 uses map data obtained from the map data delivery center 80 and map data stored in the flash memory 209 to display maps such as a map including a route to a destination and a map near the position of a vehicle, for giving route guidance. The car navigation software 504 uses correction data obtained from one of the GPS correcting base stations $90_1$ to $90_n$ to perform error correction for the position of a vehicle measured by the GPS unit 219.

Next, the map data delivery center 80 will be described.

The map data delivery center 80 delivers map data to the navigation terminal 5 via the cellular phone base station 70. As shown in FIG. 1, the map data delivery center 80 includes a server 81, a map database (DB) 82 for storing map data, and a point information database (DB) 83 for storing information indicating the types, names, addresses, and telephone numbers of primary facilities such as restaurants, gas stations, leisure facilities, and public facilities in respective areas of a map.

The server 81 can be constructed in a computer (such as a personal computer) having a typical configuration that comprises a CPU, a memory, an external storage such as a hard disk, and a communication device for performing communications with other device over the network such as the Internet.

Figure 4:
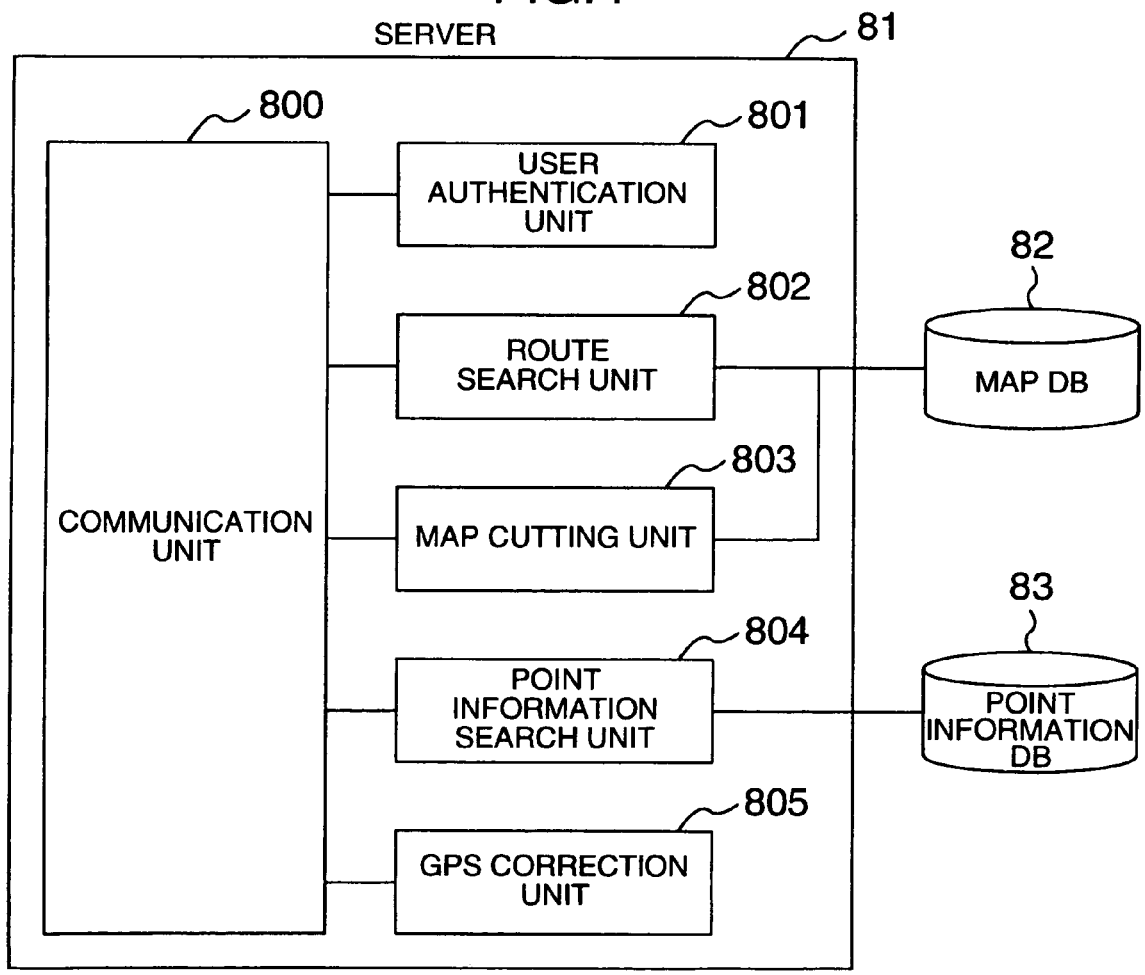
FIG. 4 is a functional block diagram of a server 81 of a map data delivery center 80 illustrated in FIG. 1.

A configuration of functional blocks of the server 81 is illustrated in FIG. 4.

The functional blocks shown in FIG. 4 are, for example, stored in the external storage such as the hard disk in advance, and then loaded into the memory by the CPU for being constructed in the computer.

In FIG. 4, a communication unit 800 performs a process by which the server 81 exchanges information with the navigation terminal 5 over the Internet, and supports an Internet protocol.

A user authentication unit 801 performs a user authentication process when accessed by the navigation terminal 5, and permits only a navigation terminal 5 registered in advance to make access to the server 81.

Upon receipt of a request from the navigation terminal 5 that has been permitted to make access to the server, a route search unit 802 is notified of the current position and the destination of the navigation terminal 5, searches for a route from the current position to the destination, using the map DB 82, and notifies the navigation terminal 5 of the result of the search.

Upon receipt of a request from the navigation terminal 5 that has been permitted to make access to the server 81, a map data cutting unit 803 reads out from the map DB 82 map data around a place, requested by the navigation terminal 5, for transfer to the navigation terminal 5.

A point information search unit 804 supports a destination search for the navigation terminal 5 that has been permitted to make access. When the navigation terminal 5 requests a list of restaurants around the current position of the navigation terminal 5, for example, the point information search unit 804 searches the point information DB 83 based on the coordinates of the current position notified from the terminal 5, and then notifies the navigation terminal 5 of the list. Upon receipt of the list, the navigation terminal 5 selects one of the restaurants included in the notified list. Then, with the selected restaurant as a destination, the navigation terminal 5 requests the server 81 to perform a route search. The route search unit 801 performs the route search described above. The point information search unit 804 also performs various searches such as an address search and a telephone number search, according to a request from the navigation terminal 5.

Figure 5:
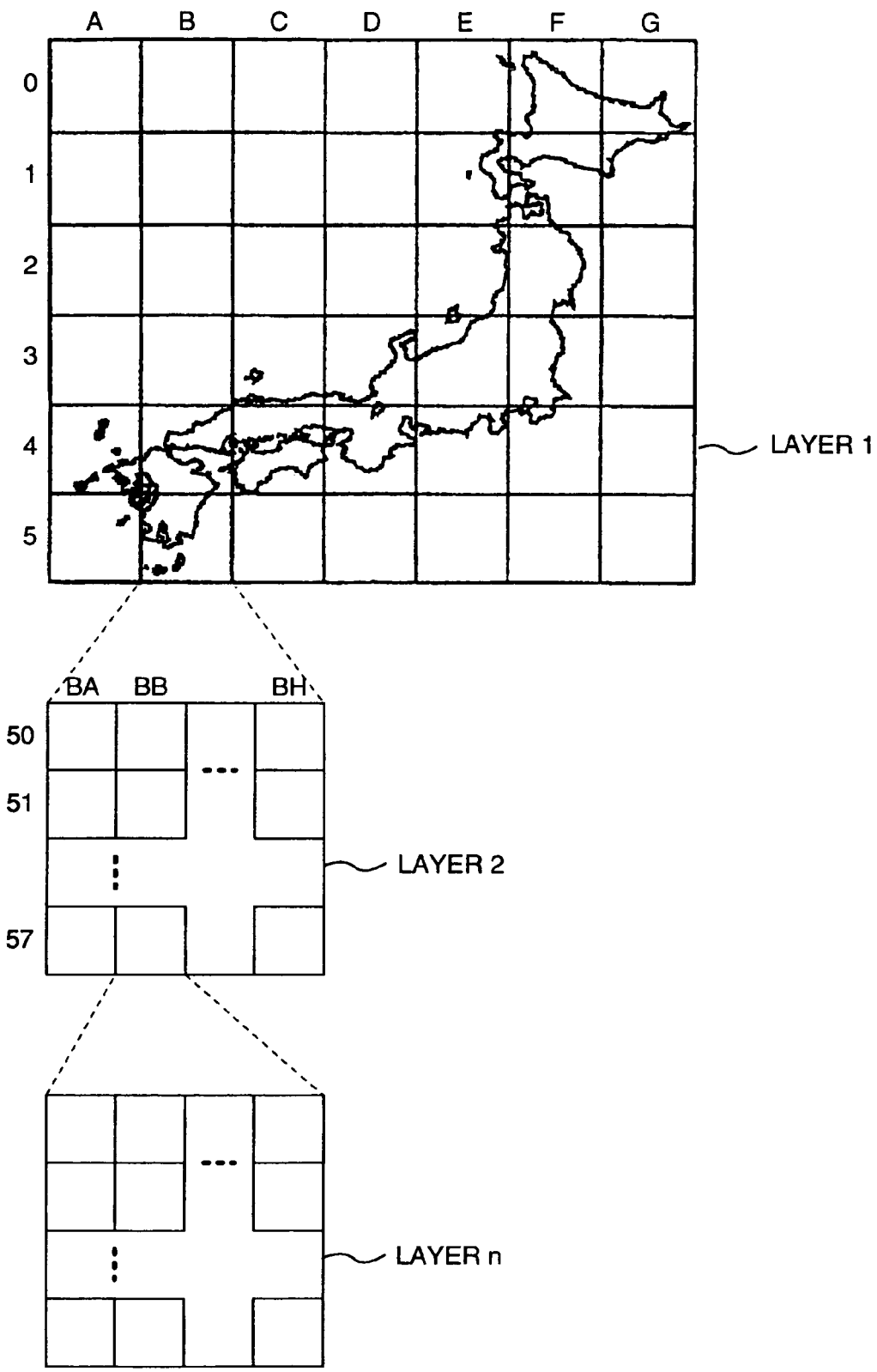
FIG. 5 is an illustrative diagram showing a configuration of map data stored in a map DB 82 in the map data delivery center 80 illustrated in FIG. 1.

FIG. 5 shows a configuration of map data stored in the map DB 82.

As illustrated, respective meshes of map data obtained by dividing an entire map into the meshes is stored in the map DB 82. Then, more detailed map data contained in the respective meshes of map data is hierarchically stored in different layers, being associated with the respective meshes of map data. In an example illustrated in FIG. 5, the entire land of Japan is divided into 42 meshes of regions. Map data for the respective meshes of regions is stored, and more detailed map data in the respective meshes of map data is hierarchically stored in different layers.

Next, the GPS correction base stations $90_1$ to $90_n$ will be described.

The GPS correction base stations $90_1$ to $90_n$ are disposed in diverse locations, being scattered all over the country. Each of the GPS correction base stations $90_1$ to $90_n$ receives the GPS signal from a GPS satellite, and uses the GPS signal to measure the its own installation position. Then, the result of measurement is compared with the exact coordinates of its installation position, thereby detecting an error in position measurement data obtained through the use of the GPS. Then, each of the GPS correction base stations generates correction data according to the error. The correction data is notified to the navigation terminal 5 via the map data delivery center 80. The navigation terminal 5 uses the correction data to correct the result of measurement performed in the GPS unit 219, thereby enabling an improvement in the accuracy of measurement of the position of a vehicle on which the navigation terminal 5 is mounted.

The GPS correction base station $90_1$ to $90_n$ can be configured by connecting the GPS antenna and the GPS unit to a computer having a communication function for performing communication with other device over a network such as the Internet. The GPS unit receives the GPS signal from the GPS satellite via the GPS antenna 50, and performs position measurement. In this case, computation of correction data is implemented by software.

Next, an operation of the navigation system will be described.

Figure 6:
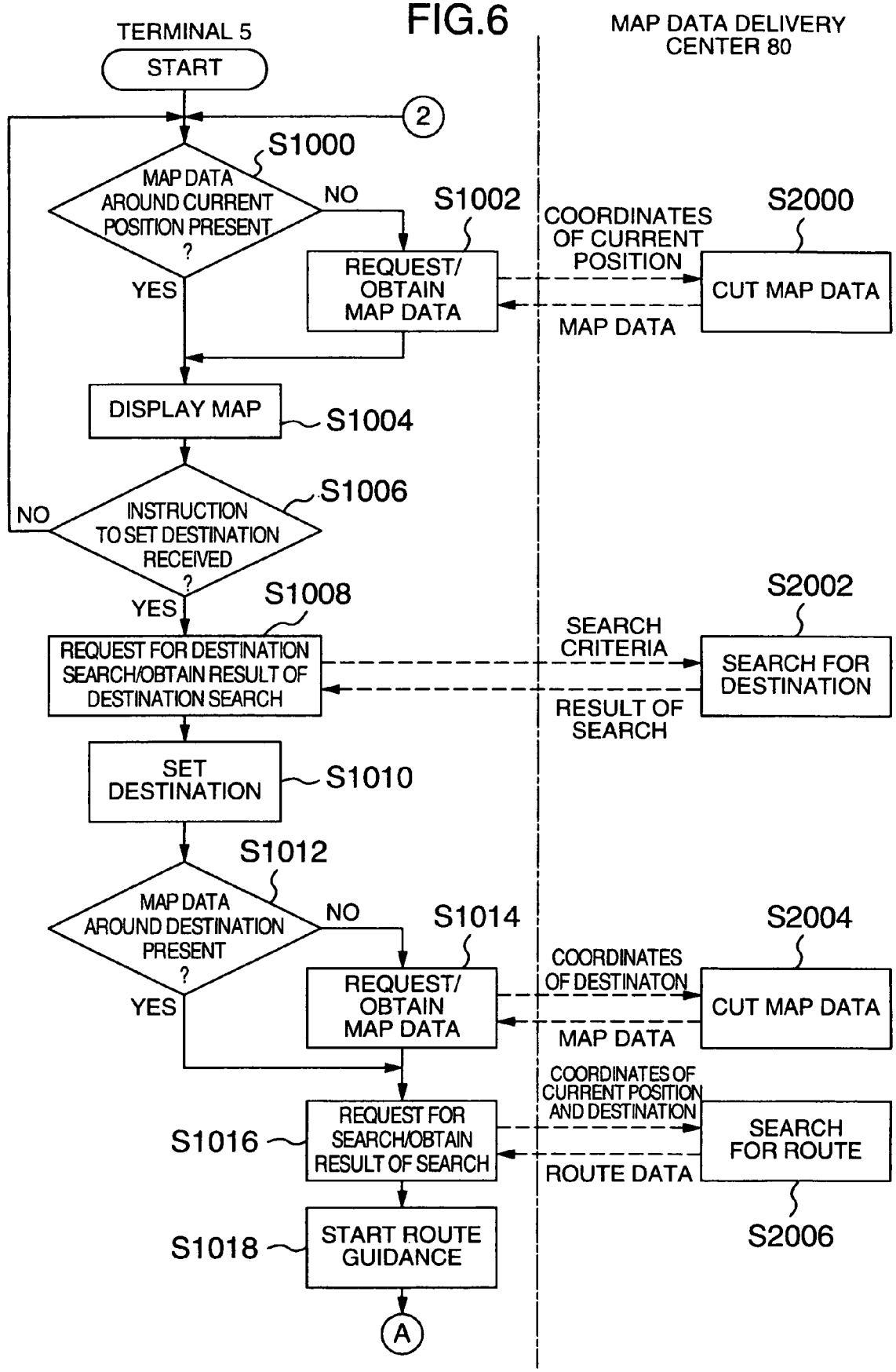
FIG. 6 is a flowchart for explaining a flow of the operation of the navigation system according to the first embodiment of the present invention.
Figure 7:
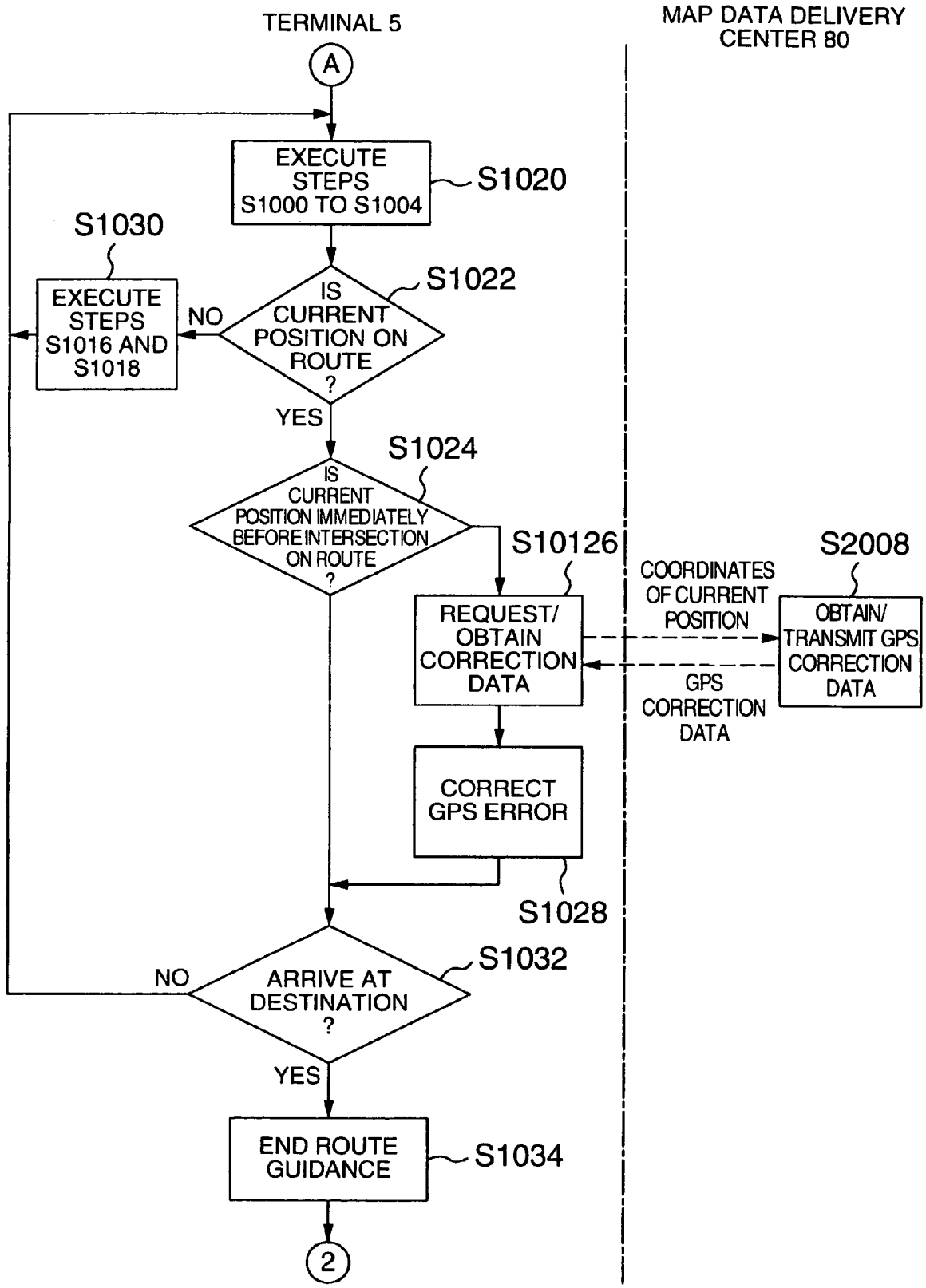
FIG. 7 is a flowchart for explaining the flow of the operation of the navigation system according to the first embodiment of the present invention.

FIGS. 6 and 7 are flowcharts for explaining flows of the operations of the navigation system according to the first embodiment of the present invention.

The operation of the navigation terminal 5 in these drawings is started when the communications software 502 and the car navigation software 504 have been loaded into the SRAM 207 or the DRAM 208 by the CPU 204 for implementation with the OS 500 and the device driver 501 already loaded into the SRAM 207 or the DRAM 208 by the CPU 204 for implementation.

First, the CPU 204 in the navigation terminal 5 obtains position measurement data from the GPS unit 219, and checks whether map data containing the coordinates of the current position of a vehicle, indicated by the position measurement data is stored on the memory card 30 (step S1000).

If the map data is not stored, the CPU makes access to the map data delivery center 80 via the modem controller 215 and the cellular phone 35, and transmits a request to transfer detailed map data around the current position of the vehicle, together with the coordinates of the current position (step S1002). At this point, the CPU also transmits to the map data delivery center information that is necessary for authentication of a user (the information is stored on the memory card 30 in advance, for example).

Upon receipt of the request and the information, the user authentication unit 801 in the map data delivery center 80 performs user authentication and permits access only when the user has been authenticated. Then when access is permitted, the map data cutting unit 803 reads out from the map DB 82 the detailed map data around the coordinates of the current position of the vehicle, notified by the navigation terminal 5, and transmits the map data to the navigation terminal 5 through the communication unit 800 (step S2000).

Upon receipt of the map data from the map data delivery center 80, the CPU 204 in the navigation terminal 5 stores the map data on the memory card 30. Further, in cooperation with the graphics processor 211, the CPU causes the display 10 to display a detailed map around the current position of the vehicle, represented by the map data (step S1004).

On the other hand, when it is found that the map data containing the coordinates of the current position of the vehicle is stored on the memory card 30 in step S1000, the CPU reads out the map data from the memory card 30. Then, in cooperation with the graphics processor 211, the CPU causes the display 10 to display the detailed map around the current position of the vehicle, represented by the map data (step S1004).

Next, the CPU 204 in the navigation terminal 5 checks whether the user has provided an instruction to set a destination through the use of the remote controller 40 or the microphone 60 (step S1006). Then, if it is found that the user has provided the instruction to set the destination, the CPU 204 receives criteria for a search for the destination entered by the user through the use of the remote controller 40 or the microphone 60, and sends the criteria to the map data delivery center (step S1008).

At this point, if access to the map data delivery center 80 has been made for the first time, or if it is found that the map data containing the coordinates of the current position of the vehicle is stored on the memory card 30 in step S1000, and the map data is then read from the memory card 30 for display on the display 10, the CPU transmits information necessary for user authentication as well. When a predetermined facility nearest to the current position of the vehicle is searched, for example, the CPU 204 receives from the user the coordinates of the current position of the vehicle and the type of the facility (such as a restaurant, a gas station, a leisure facility, or a public facility), as the destination search criteria. When the destination is searched for by its telephone number, the CPU 204 receives the telephone number from the user.

Upon receipt of the destination search criteria, the point information search unit 804 in the map data delivery center 80 reads out from the point information DB83 destination candidates that meet the search criteria notified by the navigation terminal 5. If the notified search criteria comprise the coordinates of the current position of the vehicle and the type of the facility, the point information search unit 804 searches the point information DB83 for a facility that is classified into the type notified and is located at around a location indicated by the coordinates of the current position of the vehicle. If the notified search criterion is a telephone number, the point information search unit 804 searches the point information DB83 for a facility where the notified telephone number is registered. Then, the point information search unit 804 reads out information on the facility searched (such as the type, name, address, and telephone number), from the point information DB83, and transmits the readout information to the navigation terminal 5 through the communication unit 800 (step S2002).

If the map data delivery center 80 receives information necessary for user authentication together with destination search criteria from the navigation terminal 5, the user authentication unit 801 performs authentication of the user before the search for the destination by the point information search unit 804. Then, the user authentication unit 801 permits access only when the user has been authenticated. Then, the destination search is performed.

Upon receipt of the result of the search or data on destination candidates from the map data delivery center 80, the CPU 204 in the navigation terminal 5 causes the data to be displayed on the display 10, in cooperation with the graphics processor 211. Then, the CPU 204 causes the user to select one of the destination candidates through the use of the remote controller 40, and sets the selected one of the destination candidates as the destination (step S1010).

Next, when the destination has been set, the CPU 204 in the navigation terminal 5 checks whether map data containing the coordinates of the destination is stored on the memory card 30 (step S1012). If the map data is not stored, the CPU 204 transmits a request to transfer detailed map data around the destination together with the coordinates of the destination to the map data delivery center 80 (step S1014).

Upon receipt of the request and the coordinates of the destination, the map cutting unit 803 reads out from the map DB82 the detailed map data around the coordinates of the destination notified by the navigation terminal 5, and transmits the map data to the navigation terminal 5 through the communication unit 800 (step S2004).

Upon receipt of the map data from the map data delivery center 80, the CPU 204 in the navigation terminal 5 stores the map data on the memory card 30. Next, the CPU 204 transmits to the map data delivery center 80 a request to search for a route from the current position of the vehicle to the destination together with the coordinates of the current position and the destination (step S1016). When the user requests detailed map data on an area from the current position of the vehicle to the destination at this point, the CPU 204 transmits a request to transfer the detailed map data as well.

Upon receipt of the request and the coordinates, the route search unit 802 in the map data delivery center 80 searches for a recommended route from the current position of the vehicle to the destination based on the coordinates of the current position and destination notified by the navigation terminal 5, and transmits the result of the search to the navigation terminal 5 via the communication unit 800 (step S2006). If the request to transfer the detailed map data is also notified by the navigation terminal 5, the map cutting unit 803 reads out from the map DB82 map data containing the recommended route searched by the route search unit 802, for transmission to the navigation terminal 5 together with the recommended route. Upon receipt of the data on the recommended route (or the data on the recommended route together with the detailed map data), the CPU 204 in the navigation terminal 5 stores the received data on the memory card 30.

Next, upon receipt of the recommended route data from the map data delivery center 80, the CPU 204 in the navigation terminal 5 starts to give guidance on the route to the destination according to the recommended route indicated by the recommended route data (step S1018).

Specifically, the CPU 204 gives route guidance by displaying marks indicating the current position of the vehicle and the destination on maps containing the detailed map data around the current position and the destination and the recommended route data, all stored on the memory card 30. At this point, if map data associated with a map of an area along the recommended route except the current position and the destination is stored on the memory card 30, the CPU 204 reads out the map data from the memory card 30, and causes the map data to be displayed on the display 10. If the map data is not stored on the memory card 30, the CPU separates the map data from the extensive, rough map data stored in the flash memory 209, and causes the map data to be displayed on the display 10.

Figure 8:
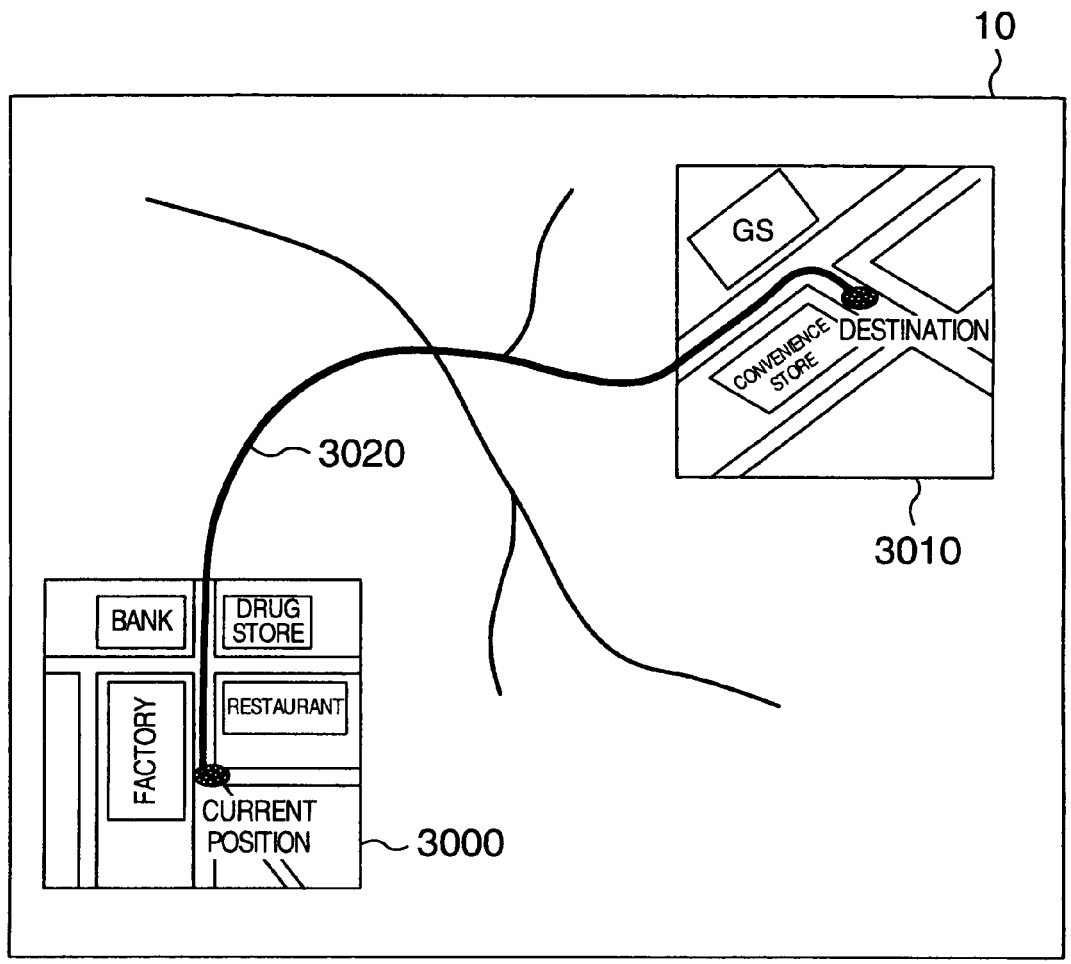
FIG. 8 is an illustrative diagram showing maps displayed on a display 10 of the navigation terminal 5 of a vehicle being under route guidance according to the first embodiment of the present invention.

FIG. 8 illustrates an example of the maps displayed on the display 10 of the navigation terminal 5 of a vehicle being under route guidance.

In FIG. 8, reference numeral 3000 denotes a map represented by detailed map data around the current position of the vehicle, which has been read out from the memory card 30. Reference numeral 3010 denotes a map represented by detailed map data around the destination of the vehicle, which has been read out from the memory card 30. Reference numeral 3020 denotes a recommended route represented by recommended route data obtained from the map data delivery center 80 and then stored on the memory card 30. In this example, the map of an area along the recommended route 3020 except the current position and the destination is read out from the flash memory 209 and then displayed. Specifically, this example illustrates the case where route guidance is being given by simultaneously displaying the detailed maps around the current position and the destination, stored on the memory card 30 and the rough map of the area along the recommended route except the current position and the destination, stored in the flash memory 209.

When the GPS 219 unit updates the current position while the vehicle is under route guidance, the CPU 204 in the navigation terminal 5 executes processes from step S1000 to step S1004, thereby updating the detailed map around the current position to be displayed on the display 10 (step 1020). Then, the CPU 204 checks whether the current position measured by the GPS unit 219 is on the recommended route (step S1022).

If the current position is on the recommended route, the CPU 204 further checks whether the vehicle has come to a point located a predetermined distance before a route change point such as an intersection on the recommended route, from which the course of the vehicle should be changed (step S1024). Then, if the vehicle has reached the route change point, the CPU 204 transmits to the map delivery center 80 a request to transmit GPS correction data together with the coordinates of the current position of the vehicle (step S1026).

The predetermined distance before the route change point is at most 200 m, for example. The distance of 200 m is determined because the error caused by the GPS is approximately 100 m, as described above. In order to display the mark of the current position of the vehicle on the display 10 so that the user can change the course at the route change point without error, it is necessary to correct the error in position measurement data caused by the GPS at a point further before the point that is located 100 m before the route change point.

Upon receipt of the request to transmit the GPS correction data from the navigation terminal 5, the GPS correction unit 805 in the map data delivery center 80 selects one of the GSP correction base stations $90_1$ to $90_n$, which is the nearest to the coordinates of the current position of the vehicle that have been transmitted together with the request. Then, the GPS correction unit 805 obtains the GPS correction data from the selected base station and transfers the GPS correction data to the navigation terminal 50 (step S2008).

Upon receipt of the GPS correction data, the CPU 204 in the navigation terminal 5 uses this data to correct the result of measurement by the GPS unit 219 (step S1028). For displaying the current position of the vehicle on a map, the accuracy is in particular required when the vehicle has come close to the route change point such as an intersection where the course of the vehicle should be changed. In this embodiment, therefore, when the vehicle has come close to the route change point, an error in position measurement by the GPS unit 219 is corrected.

If the CPU 204 in the navigation terminal 5 has judged that the current position of the vehicle measured by the GPS unit 219 is not on the recommended route (or a negative reply has been obtained in step S1022), that is, if the current position has been deviated from the recommended route, the CPU 204 executes processes in steps S1016 and S1018. The CPU 204 causes the map data delivery center 80 to search for a recommended route from the current position to the destination again and starts to give route guidance again (step S1030).

Figure 9:
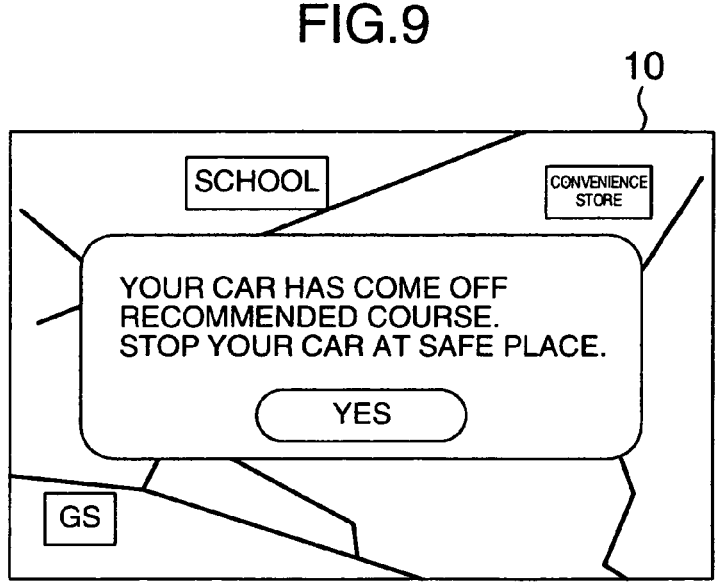
FIG. 9 is an illustrative diagram showing an example of guidance displayed on the display 10 of the navigation terminal 5 of the vehicle being under route guidance according to the first embodiment of the present invention when the current position of the vehicle has been deviated from a recommended route.

Incidentally, if the current position has been deviated from the recommended route, the CPU 204, in cooperation with the graphics processor 211, may cause a picture as illustrated in FIG. 9 to be displayed on the display 10. Then, the CPU 204 may give guidance so that the user stops the vehicle. The CPU 204 may continue display of the picture until the user has entered confirmation through the use of the remote controller 40 or the microphone, or the parking brake sensor 25 has sensed the state where the parking brake is applied. Then, after the confirmation from the user has been entered, or after the state where the parking brake is applied has been detected, the CPU 204 may ask whether a search for a recommended route is to be performed again or not, through the display 10 or the loudspeaker contained in the display 10. Only when a replay to the effect that the search for the recommended route is performed again has been obtained from the user through the remote-controller 40 or the microphone 60, the CPU 204 may execute processes in step S1030. If the reply to that effect has not been obtained, the procedure may be returned to step S1000.

If the vehicle, the current position of which has been updated through the use of the GPS unit 219, has reached the destination (or an affirmative reply has been obtained in step S1032), the CPU 204 in the navigation terminal 5 terminates route guidance (step S1032). Then, the procedure is returned to step S1000, for continuation of the above-mentioned processes.

The above is a description about the first embodiment of the present invention.

According to this embodiment, if detailed map data stored on the memory card 30 does not contain all the map data on a route from the current position of a vehicle to a destination, rough map data on the route is read out from the flash memory 209, and a map represented by the rough map data is displayed on the display 10. Accordingly, even when the amount of map data obtained from the map data delivery center 80 is reduced to effect a reduction in the amount of communication data, maps for route guidance can be quickly displayed. Even in this case, detailed map data around the current position of the vehicle and destination is delivered from the map data delivery center 80 as necessary, for storage on the memory card 30. Thus, detailed maps around the current position and the destination can be displayed on the display 10. With this arrangement, information required by the user especially for route guidance, can be provided efficiently.

Further, according to the present invention, when the current position of the vehicle being under route guidance has been deviated from a recommended route, the user is checked to see whether a search for a new route to the destination should be made again. Thus, the user can take appropriate action according to whether the current position has been deviated from the recommended route intentionally or unintentionally.

Further, according to this embodiment, a receiver for receiving map data, which is the cellular phone 35 in this embodiment, also serves as a receiver for obtaining GPS correction data from the map data delivery center 80. For this reason, special hardware such as an FM receiver or a gyro sensor for obtaining the GPS correction data is not required, so that this embodiment can improve measuring accuracy while effecting a reduction in the cost of the navigation terminal 5.

In addition, in this embodiment, the memory card 30 that is removable from the terminal main unit 20 of the navigation terminal 5 is employed as a storage for storing detailed map data. For this reason, a plurality of the memory cards 30 respectively storing detailed map data for different areas can be employed. Further, a personal computer installed at home, not shown, for example, can also be employed for downloading from the map data delivery center 80 detailed map data to be stored on the memory card 30.

In this embodiment, the GPS correction data is requested when the vehicle being under route guidance to the destination, becomes close to the route change point on the recommended route such as an intersection where the course of the vehicle should be changed. The present invention is not limited to this case. A request for the GPS correction data may also be made in step S1016 in FIG. 6 or step S1030 in FIG. 7 where the request to search for the recommended route from the current position to the destination is made to the map data delivery center 80. Alternatively, even when the vehicle is not being under route guidance, the request for the GPS correction data may also be made to the map data delivery center 80 when the vehicle has become close to an intersection located in the advance direction of the vehicle.

In this embodiment, communication between the navigation terminal 5 and the map data delivery center 80 is made by the cellular phone. The present invention is not limited to this. To take an example, transmission of information from the navigation terminal 5 to the map data delivery center 80 may be performed by the cellular phone, and transmission of information from the map data delivery center 80 to the navigation terminal 5 may be performed by using digital broadcasting.

Next, a second embodiment of the present invention will be described.

Figure 10:
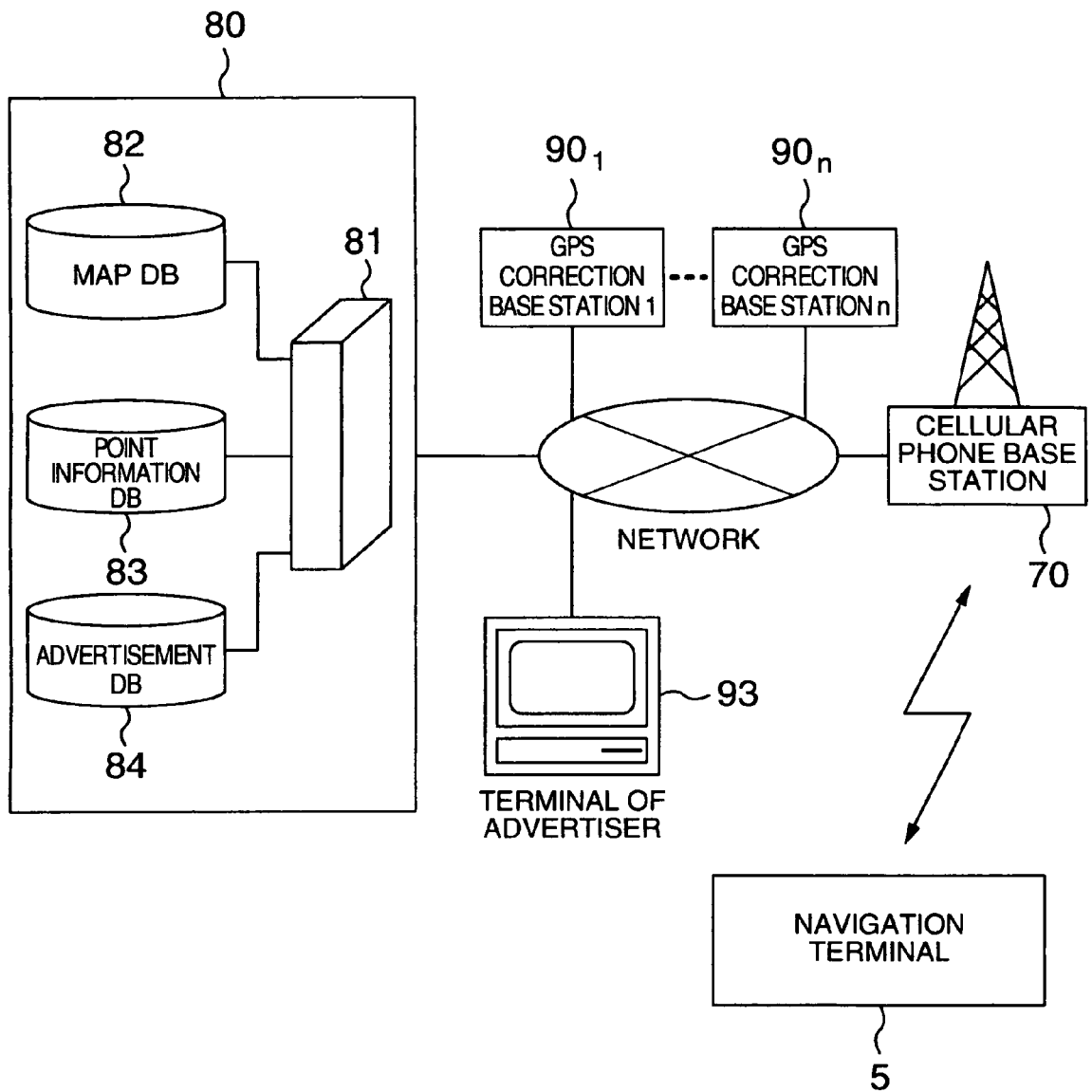
FIG. 10 is an illustrative diagram schematically showing a navigation system according to a second embodiment of the present invention.

FIG. 10 is an illustrative diagram schematically showing a configuration of a navigation system according to the second embodiment of the present invention. Elements that have the same functions as those in FIG. 1 according to the first embodiment are indicated by like reference numerals and characters.

The navigation system according to this embodiment is different from the navigation system according to the first embodiment in that the map data delivery center 80 has a function of transmitting to the navigation terminal 5 data on an advertisement requested by an advertiser to be advertised. Then, when coupon information for a commodity discount is issued to a user who has seen the data on the advertisement, issue of the coupon information is notified to a terminal 93 of the advertiser.

As illustrated, the map data delivery center 80 according to this embodiment comprises a server 81', the map DB 82, the point information DB 83, and an advertisement database (DB) 84.

Data on advertisements requested by advertisers to be advertised or coupon information is stored in the advertisement DB 84, together with the names and coordinates of shops of the advertisers, for example.

Figure 11:
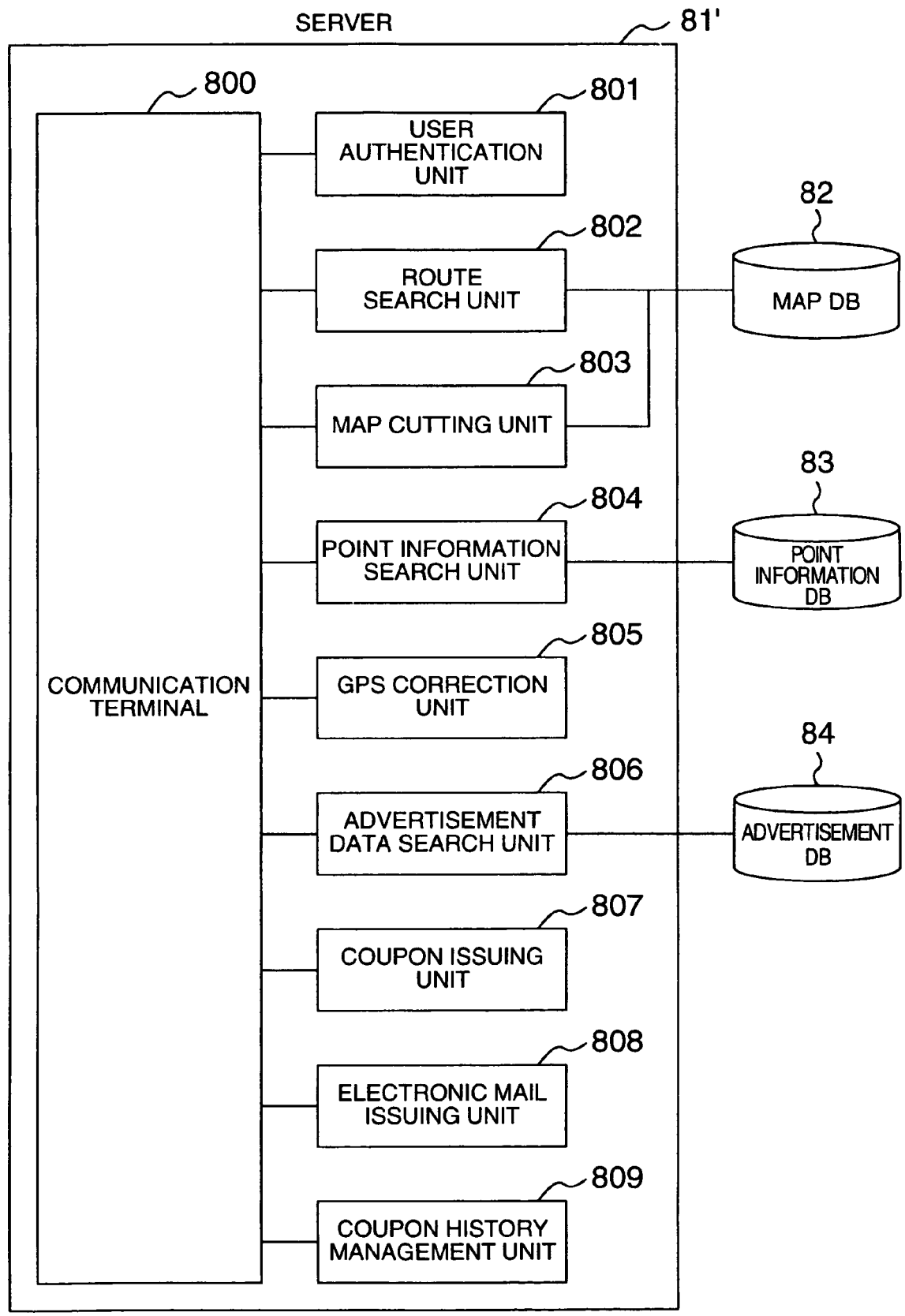
FIG. 11 is a functional block diagram of a server 81' of the map data delivery center 80 illustrated in FIG. 1.

FIG. 11 shows a configuration of functional blocks of the server 81'.

As illustrated, the server 81' according to this embodiment is obtained by adding an advertisement data search unit 806, a coupon issuing unit 807, an electronic mail issuing unit 808, and a coupon history management unit 809 to the server 81 according to the first embodiment, illustrated in FIG. 4.

The advertisement data search unit 806 searches the advertisement DB 84 for advertisement data on a facility contained in map data cut by the map data cutting unit 803, based on the coordinates and the name of the facility, for example. Then, the advertisement data search unit 806 reads out the searched advertisement data and associates it with the corresponding facility for transmission to the navigation terminal 5, together with the map data that has been cut, through the communication unit 800.

When requested to issue a coupon for advertisement data transmitted to the navigation terminal 5, the coupon issuing unit 807 generates a coupon number for identifying the coupon that will be issued to the navigation terminal 5.

Then, the coupon issuing unit 807 transmits the generated coupon number to the navigation terminal 5 through the communication unit 800.

The electronic mail issuing unit 808 notifies the terminal of the advertiser of the advertisement data, of the coupon number issued by the coupon issuing unit 807, using an electronic mail. Further, the electronic mail issuing unit 808 notifies the navigation terminal 5 as well, which has requested to issue the coupon, of the coupon number, as necessary.

The coupon history management unit 809 manages a coupon issue history (such as a combination of a coupon number, advertisement data, an address of the terminal 93 of the advertiser, and an address of the navigation terminal 5 accessed).

Figure 12:
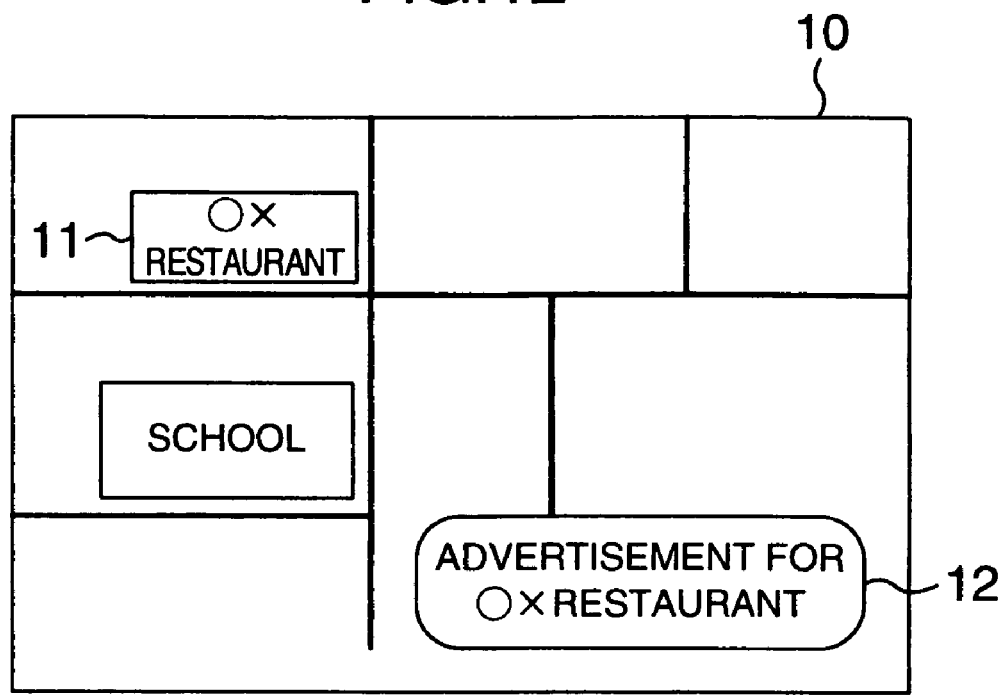
FIG. 12 is an illustrative diagram showing a display example of map data transmitted to the navigation terminal 5 from the map data delivery center 80, according to the second embodiment of the present invention.

FIG. 12 shows an example of display of map data transmitted to the navigation terminal 5 by the map data delivery center 80 configured as described above. This example shows the case where a map around the current position of a vehicle being stopped is displayed on the display of the navigation terminal 5 (or shows the state where steps S1000 to S1004 in FIG. 6 have been executed). On the map displayed on the screen of the display 10, the name of a facility "○× restaurant" contained in map data is displayed, being superimposed on the display position of the facility. At this point, when advertisement data on this facility has been sent together with the map data, the advertisement data on the facility is displayed in outline, being reduced in size, as a banner advertisement 12 in the bottom right-hand corner of the display screen.

Figure 13:
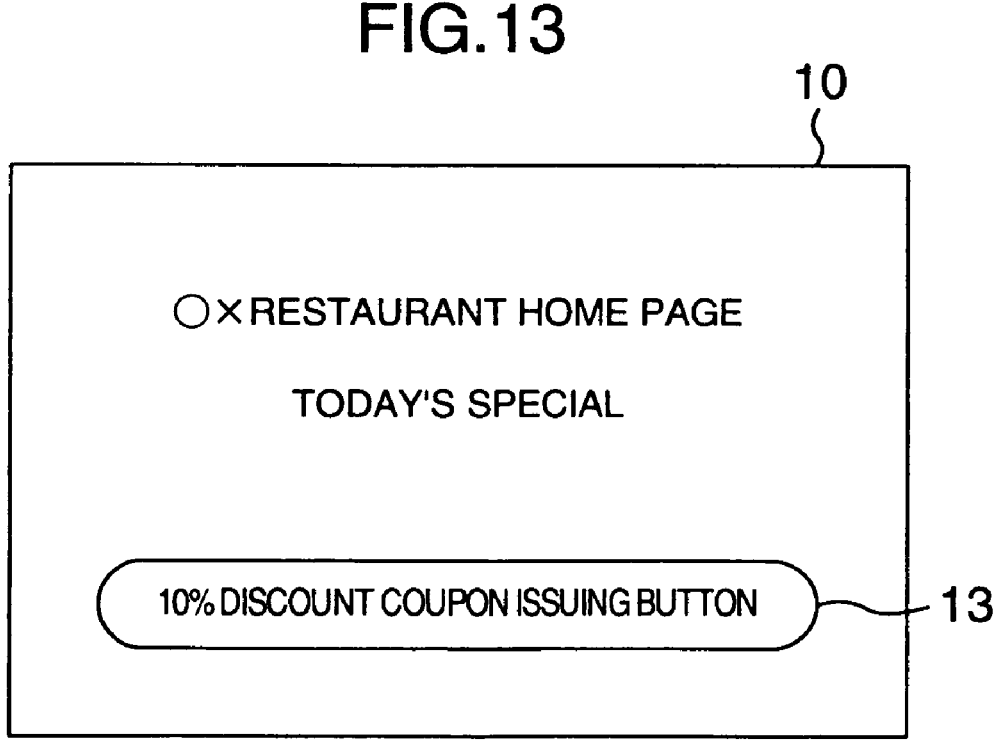
FIG. 13 is an illustrative diagram showing a display example on a display screen illustrated in FIG. 12 when a user of the navigation terminal 5 has selected a banner advertisement 12 using a remote controller 40.

FIG. 13 shows an example of display where the user of the navigation terminal 5 has selected the banner advertisement 12 on the display screen in FIG. 12, using the remote controller 40. As shown in this drawing, the details of the advertisement data displayed in outline as the banner advertisement 12, or coupon information is displayed together with a coupon issuing button 13.

Figure 14:
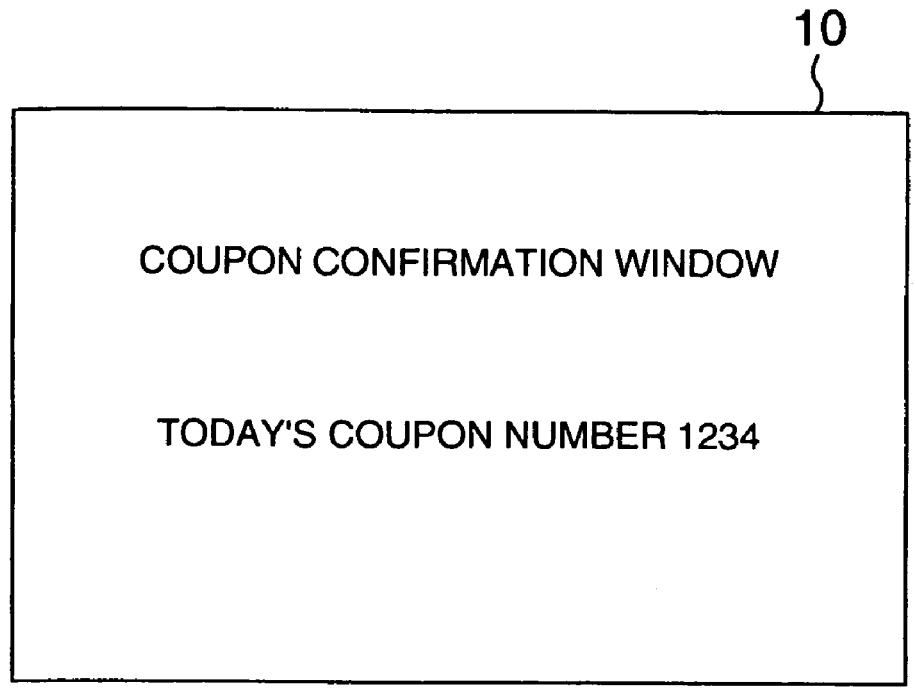
FIG. 14 is an illustrative diagram showing a display example on the display screen in FIG. 13 when the user of the navigation terminal 5 has selected a coupon issuing button 13 using the remote controller 40.

FIG. 14 shows an example of display where the user of the navigation terminal 5 has selected the coupon issuing button 13 on a display screen shown in FIG. 13, using the remote controller 40. When the coupon issuing button 13 has been selected, the navigation terminal 5 transmits to the map data delivery center 80 a request to issue a coupon for the advertisement data being displayed. Upon receipt of the request, the coupon issuing unit 807 of the map data delivery center 80 generates a coupon number for identifying the coupon that will be issued to the navigation terminal 5, for transmission to the navigation terminal 5. The coupon number is also notified to the terminal 93 of the advertiser of the advertisement data by the electronic mail issuing unit 808, by using an electronic mail. Thus, the user of the navigation terminal 5 memorize the coupon number displayed on the screen as "Today's Number 1234". Then, when using the facility of the advertiser of the advertisement data, by telling the coupon number, the user can obtain discount service.

Figure 15:
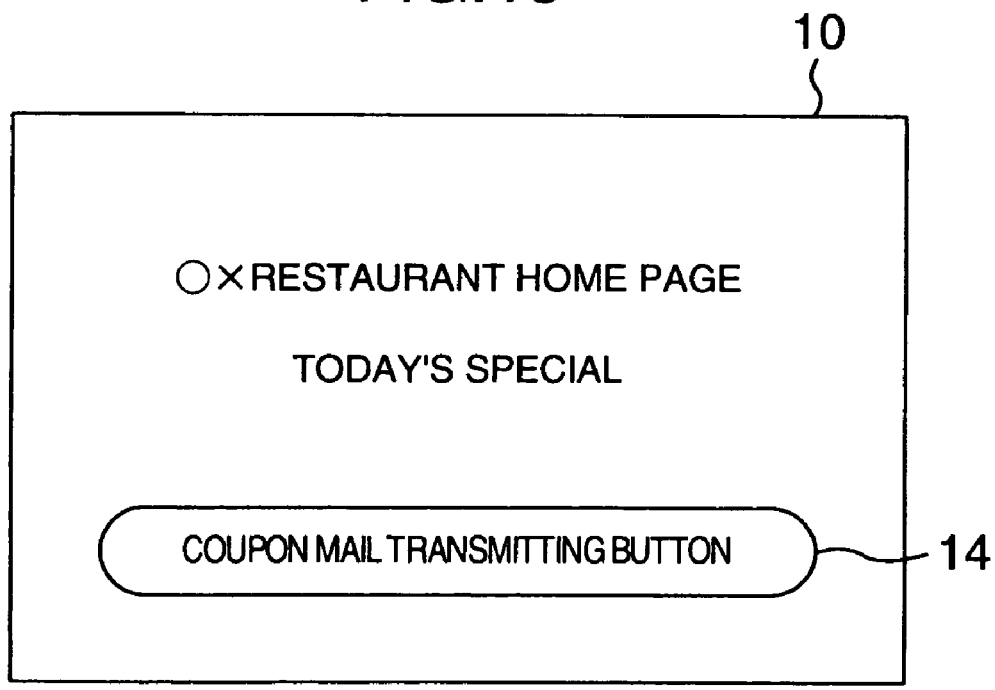
FIG. 15 is an illustrative diagram showing a display example where a coupon mail transmitting button 14 is displayed in place of the coupon issuing button 13 on the display screen illustrated in FIG. 13.

FIG. 15 is a variation of display shown in FIG. 13, and shows an example where the coupon mail transmitting button 14 is displayed in place of the coupon issuing button 13. When the user of the navigation terminal 5 has selected the coupon mail transmitting button 14 using the remote controller 40, the request to issue the coupon for the advertisement data being displayed is transmitted to the map data delivery center 80 together with the mail address of the cellular phone 35, stored in advance. Upon receipt of the request and the mail address, the coupon issuing unit 807 of the map data delivery center 80 generates the coupon number for identifying the coupon that will be issued to the navigation terminal 5. Then, the electronic mail issuing unit 808 notifies the cellular phone 35 having the mail address added to the coupon issuing request, of the coupon number, using an electronic mail.

Figure 16:
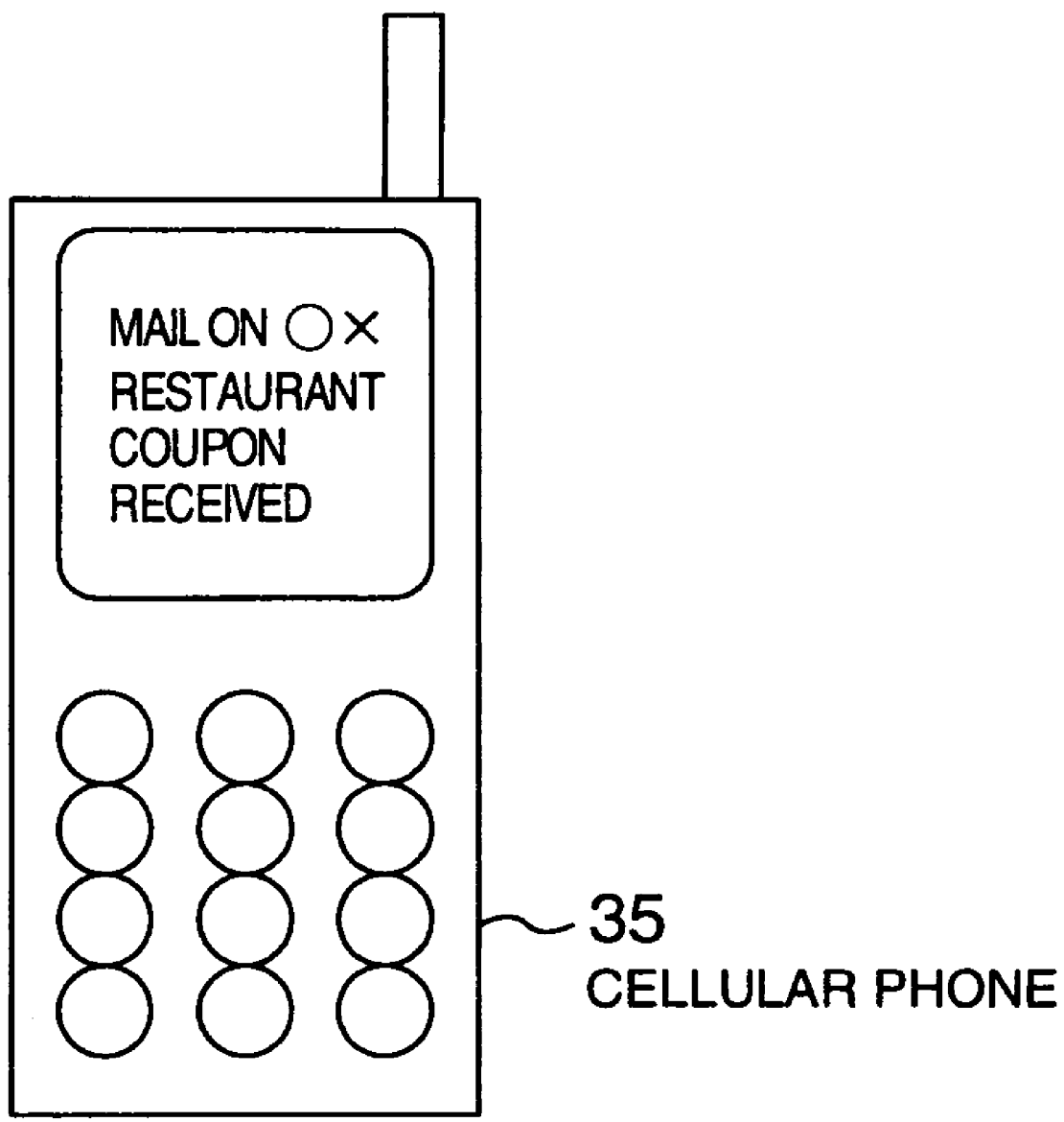
FIG. 16 is a diagram showing a display example of a mail received at a cellular phone 35 of a user when the user of the navigation terminal 5 has selected a coupon mail transmitting button 14 using the remote controller 40.

FIG. 16 shows an example of display of the mail which indicates that the coupon number has been received by the cellular phone 35. Suppose the user of the navigation terminal 5 carries the cellular phone 35 when getting off the vehicle. Then, when using the facility of the advertiser of the advertisement data, if the user presents the cellular phone 35 that displays this mail, he can obtain discount service.

The above is a description about the second embodiment of the present invention.

According to this embodiment, in response to a request from the navigation terminal 5 that has received advertisement data, the map data delivery center 80 notifies the navigation terminal 5 of coupon information. Further, the map data delivery center 80 notifies the advertiser terminal 93 that the coupon information has been notified to the navigation terminal 5. Accordingly, this embodiment can provide an environment where an advertisement coupon can be utilized even if a printer cannot be installed. Further, since the advertiser can keep track of the frequency of notification of the coupon information by the map data delivery center 80, he can learn about the effect of the advertisement using the map data delivery center 80 on sales. Still further, the coupon history management unit 809 of the map data delivery center 80 manages issue of coupons. The map data delivery center 80 can thereby charge the advertiser an appropriate advertisement fee.

As described above, according to the present invention, the operability of a navigation system that downloads map data delivered through communication or broadcasting to give route guidance can be improved.

Specifically, even if map data to be transferred from the map data delivery center to the navigation apparatus is reduced so as to effect a reduction in the amount of communication data, maps for route guidance can be displayed quickly.

When the position of a vehicle being under route guidance has been deviated from a route searched by a route search, the present invention can inform the user of deviation and can help the user to take appropriate action.

Further, the present invention can improve position measuring accuracy while effecting a reduction in the cost of the navigation apparatus.

Still further, the present invention can provide an environment where an advertisement coupon can be utilized even if a printer cannot be installed.

It should be further understood by those skilled in the art that the foregoing description has been made on embodiments of the invention and that various changes and modifications may be made in the invention without departing from the spirit of the invention and the scope of the appended claims.

What is claimed is:

1. A navigation apparatus for providing route guidance, comprising:
   a communication unit which obtains map data delivered through communication;
   a first memory area which stores detailed map data obtained by sending information of a starting position and a destination to a server, and downloading a detailed map of predetermined area around the starting position and the destination through the communication unit from the server;

a second memory area which stores a nationwide simplified map in advance;

a route guidance controller which requests a search to the server for a guidance route from the starting position to the destination by the communication unit, downloads information of the guidance route, and provides route guidance based upon the information of the guidance route by displaying the detailed map which has been downloaded and stored in the first memory area, when the route guidance is being provided on the predetermined area around the starting position and the destination, and by displaying the simplified map which has been stored in the second memory area, when running out of the predetermined area, wherein map data stored in the second memory area shows a much simplified map than a map shown by map data downloaded and stored in the first memory, and wherein the first memory area and the second memory area are provided by different memory devices.

2. The navigation apparatus according to claim 1, wherein the map data stored in the second storage area represents the map that is more simplified than the map represented by the map data delivered and then stored in the first storage area.

* * * * *